United States Patent [19]

Sukenik

[11] 4,352,230
[45] Oct. 5, 1982

[54] FIBER COVERED ROLLER FOR HIGH TEMPERATURE APPLICATIONS

[75] Inventor: Robert J. Sukenik, Bloomfield Hills, Mich.

[73] Assignee: New Hudson Corporation, New Hudson, Mich.

[21] Appl. No.: 111,219

[22] Filed: Jan. 11, 1980

[51] Int. Cl.³ .................. B21B 31/08; B60B 7/04; B60B 11/04
[52] U.S. Cl. ............................. 29/125; 29/130; 29/132
[58] Field of Search ............ 29/130, 125, 132

[56] References Cited

U.S. PATENT DOCUMENTS

| | | | |
|---|---|---|---|
| 2,607,072 | 8/1952 | Johnson | 29/126 X |
| 2,788,957 | 4/1957 | Lindquist | 263/6 |
| 3,457,618 | 7/1969 | O'Neal et al. | 29/125 |
| 3,812,782 | 5/1974 | Funahashi | 29/125 X |
| 3,853,525 | 12/1974 | Gormann | 65/181 |
| 3,964,658 | 6/1976 | Edwards | 29/125 X |
| 4,008,598 | 2/1977 | Purcupile et al. | 29/125 X |

*Primary Examiner*—Wayne L. Shedd
*Attorney, Agent, or Firm*—Harness, Dickey & Pierce

[57] ABSTRACT

A metallic cylindrical mandrel is covered with short cylindrical fiber shells and is used for high temperature applications. The shells are fabricated of aluminum silicate fibers with a binder and are independent of each other to permit relative movement between the shells and the cylinder due to thermal expansion and bending.

6 Claims, 14 Drawing Figures

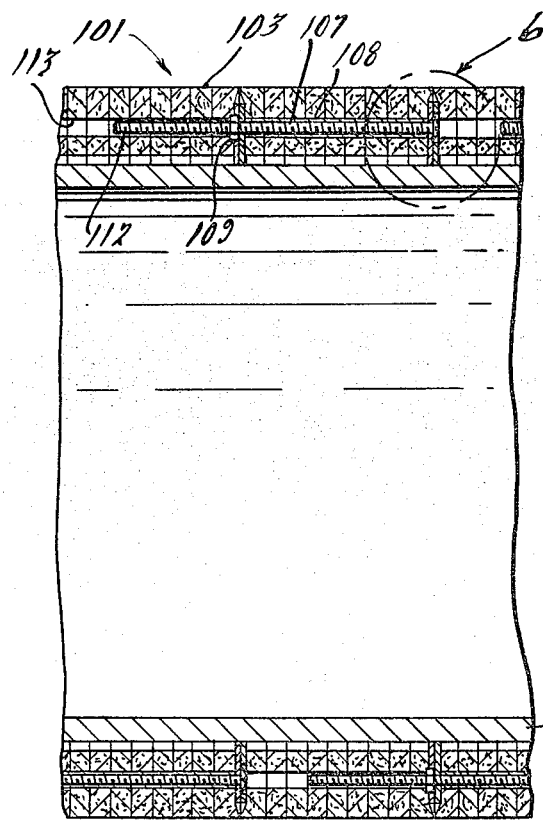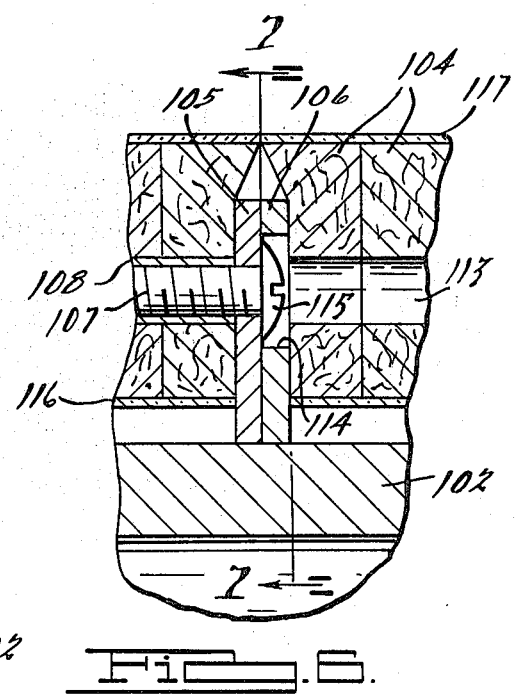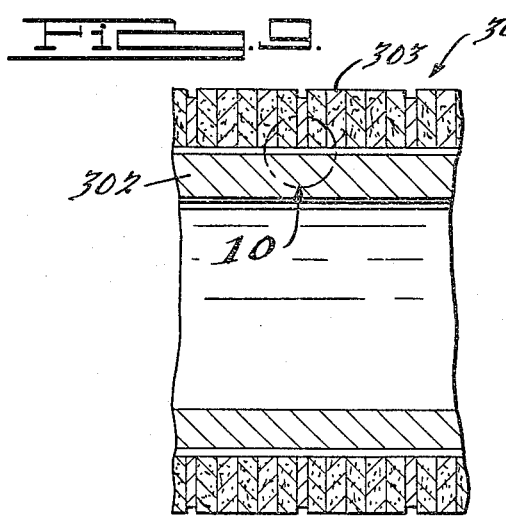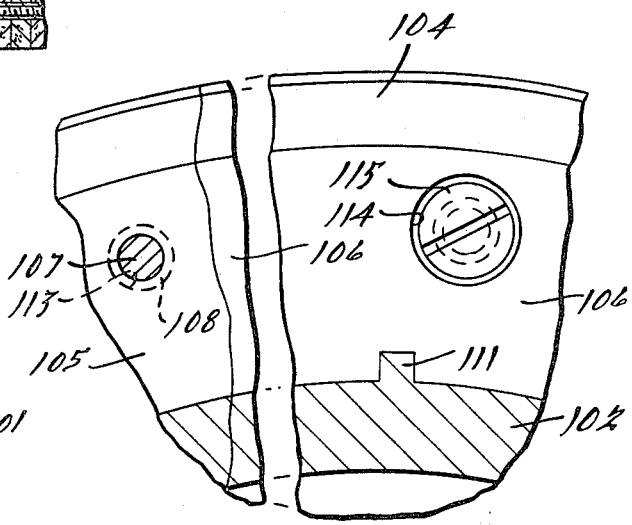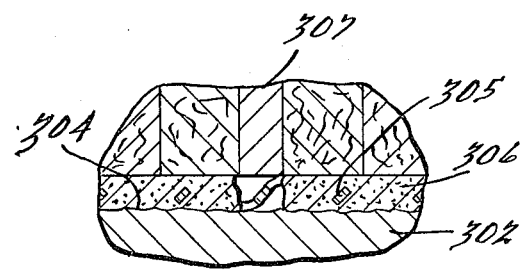

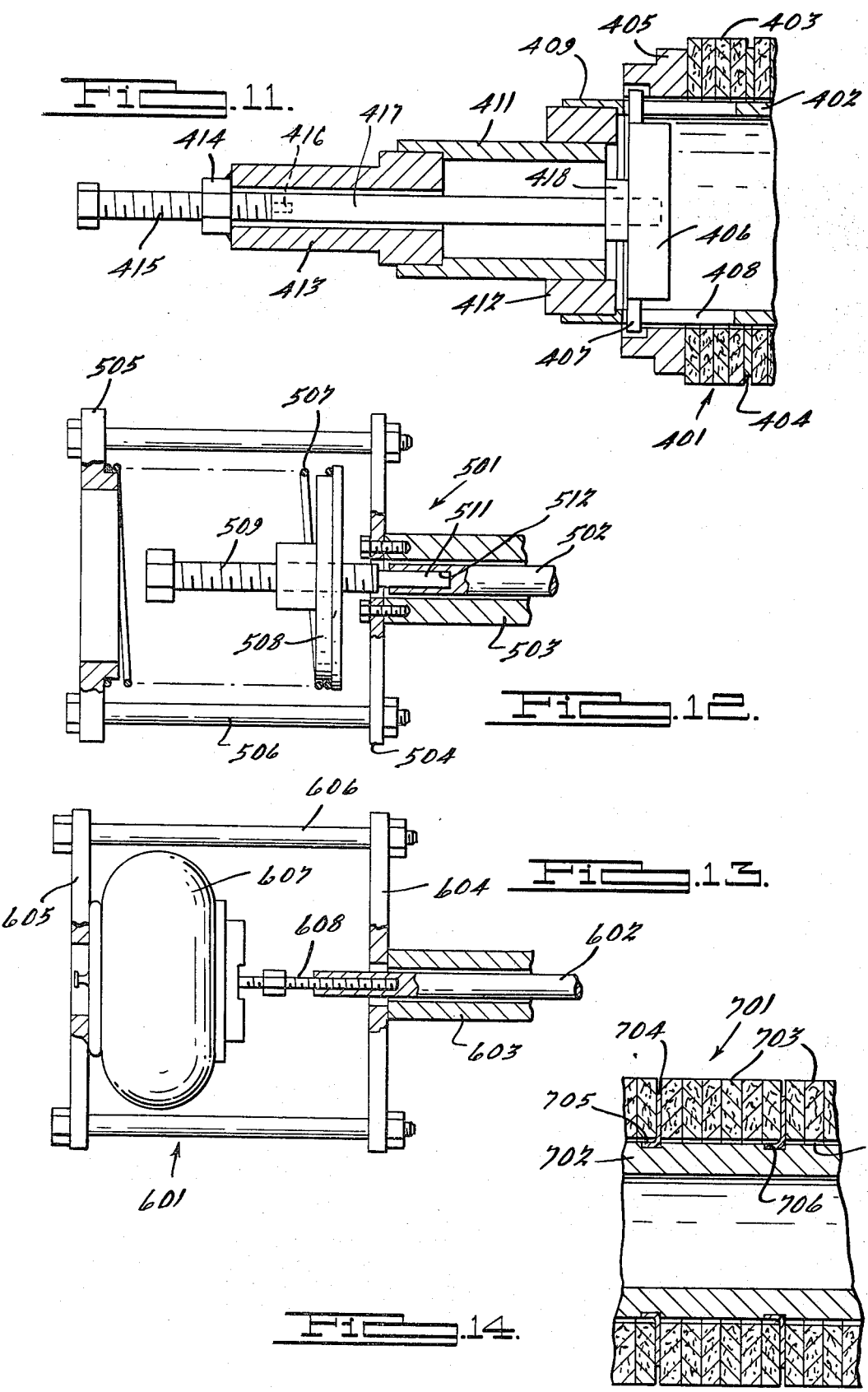

FIBER COVERED ROLLER FOR HIGH TEMPERATURE APPLICATIONS

BACKGROUND OF THE INVENTION

1. Field of the Invention

The invention relates to fiber covered rolls used in the production of glass, aluminum or steel, and in other industries, for the purpose of conveying the product through a furnace, lehr, dryer or oven. The function of the roller may be to move the product without marking it, to prevent a thermal shock condition, or to eliminate "pick-up" of the conveyed material on the roller surface.

2. Description of the Prior Art

Conventional methods of fabricating these rollers formerly included the use of a metallic cylindrical mandrel on which asbestos discs are mounted and compressed, and then machined to be concentric. Health problems have caused asbestos to be replaced with other materials such as ceramic fibers, but these are sometimes undesirably brittle. Aluminum silicate fibers are available in the form of boards manufactured by a felting process. "Kaowool" and "Fiberfrax" are trademarks of such aluminum silicate fibers. The fibers are used with binders of the aluminum phosphate and/or silicon dioxide family, among others. A commonly used binder which is a colloidal silicon dioxide mixture is marketed under the trademark "Ludox", manufactured by the Dupont Company.

Among the problems of substituting aluminum silicate fiberboard directly for asbestos fiberboard is fiber breakage caused by brittleness of the dry aluminum silicate board when it is subject to compression, which may result in premature fiber failure. At elevated temperatures, a typical Ludox bound aluminum silicate fiber is also subject to shrinkage which may cause the fiber discs to become loose on the metal mandrel, creating relative movement and accelerated fiber damage.

Blom U.S. Pat. No. 3,763,533 shows a roller having a metal mandrel with a long monolithic fiber shell. This type of construction is unsuccessful because the monolithic fiber shell shrinks in all dimensions when exposed to elevated temperatures while the metal mandrel expands. When the shell shrinks in an axial direction while the metal mandrel expands, the shell may become loosened due to loss of end compression and rotate relative to the mandrel. It may crack or disintegrate due to large circumferential gaps being developed in a random manner. These "gaps" due to fiber shrinkage and mandrel axial expansion may consist of only a few large gaps across the full face of the roll covering. Large gaps may cause premature disc failure by allowing edge breakdown and disc separation and sideways collapse. Large gaps may also be objectionable in terms of product conveying. Furthermore, because of the ceramic-like characteristics of the bonded fiber shell, bending forces result in virtually no deflection, whereas the metal mandrel on which it is mounted will deflect. The result is that the ceramic shell is "milled out" in its central portion. At some point in time this milling will cause cracking, and the shell will begin to flop back and forth on the metal mandrel, resulting in additional wear. A catastrophic failure could occur in a relatively short period of time.

A search of the prior art has revealed the following pertinent U.S. patents:

Gaskell Pat. No. 1,930,999
Sherts Pat. No. 2,300,528
Lindquist Pat. No. 2,788,957
Keith Pat. No. 3,306,254
Goulding Pat. No. 2,501,629
Weber Pat. No. 1,883,183
Kitazawa Pat. No. 3,710,469
Gorman Pat. No. 3,853,525

In Gaskell Pat. No. 1,930,999 the roller has asbestos discs which may be compressed by the bolt 9 or the nut. However it does not show the features of the present invention.

In Keith Pat. No. 3,306,254 the washers 19 are held between end plates with a bolt 24 to compress the discs.

Goulding Pat. No. 2,501,629 was selected because it shows a roller using tie rods for holding the discs together, although in this structure there is an outer sleeve over the discs.

The remaining patents were selected as being of additional interest as they also relate to rollers with end pressure means or with discs on a mandrel.

In addition, my U.S. Pat. No. 3,815,197 relates to various means for forming rollers. U.S. Pat. No. 3,224,927 pertains to forming inorganic heat-resistant fiber material containing cationic starch and colloidal silica.

BRIEF SUMMARY OF THE INVENTION

It is an object of the present invention to provide a novel and improved roller for high temperature applications which eliminates the above described expansion and wear problems, and accommodates the expansion differentials between the metal mandrel and shell, as well as the transverse bending forces mentioned above.

It is another object to provide an improved roller of this character which utilizes known materials in a novel manner but greatly increases the longevity and effective useful life of the roller.

It is a further object to provide an improved high temperature roller of this nature in which the shell components may be held in their proper position by any of several different methods while still permitting the relative movements between the mandrel and shell described above.

Briefly, the high temperature roller of this invention comprises an elongated cylindrical metal mandrel, a series of relatively short monolithic shell sub-assemblies on said mandrel, each sub-assembly being fabricated of fibers taken from the group comprising aluminum silicate, glass, or mineral wool and a binder, means separating said sub-assemblies whereby transverse bending of said mandrel will be accommodated by relative angular shifting of said sub-assemblies, and means holding said sub-assemblies on said mandrel while permitting relative movement between the mandrel and sub-assemblies due to bending of the mandrel and differences in thermal expansion.

BRIEF DESCRIPTION OF THE DRAWINGS

FIG. 5 is a partially cross sectioned view of another embodiment of the invention in which the monolithic sub-assemblies have metallic end plates held together by threaded means which permits predetermined compression and interlocks adjacent sub-assemblies;

FIG. 6 is an enlarged fragmentary view of a portion of FIG. 5 indicated by the circle 6;

FIG. 7 is an end cross-sectional view of FIG. 6 taken along the line 7—7 thereof, parts being broken away;

FIG. 9 is a view of still another embodiment of the invention in which the monolithic sub-assemblies are separately secured to the mandrel;

FIG. 10 is an enlarged fragmentary cross-sectional view of FIG. 9 taken in the area marked 10;

FIG. 11 is a fragmentary cross-sectional view showing another embodiment of the invention having an internal end take-up system which is manually adjustable;

FIG. 12 is a fragmentary cross-sectional view of yet another embodiment which is also an internal take-up system but is spring loaded;

FIG. 13 is a fragmentary cross-sectional view of an additional embodiment having an air loaded internal take-up system, and FIG. 14 is a fragmentary cross-sectional view showing a variation of the expansion joint system in which the metal spacers snap into locking grooves on the mandrel.

DESCRIPTION OF THE PREFERRED EMBODIMENTS

Figure 1:
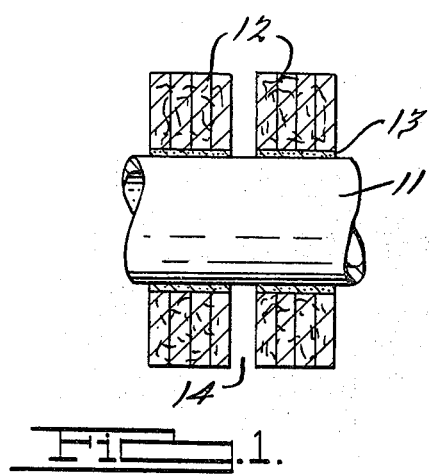
FIG. 1 is a partially sectioned schematic view showing one manner of carrying out the invention, namely, by attaching each short cylindrical bonded fiber shell separately to the mandrel.
Figure 2:
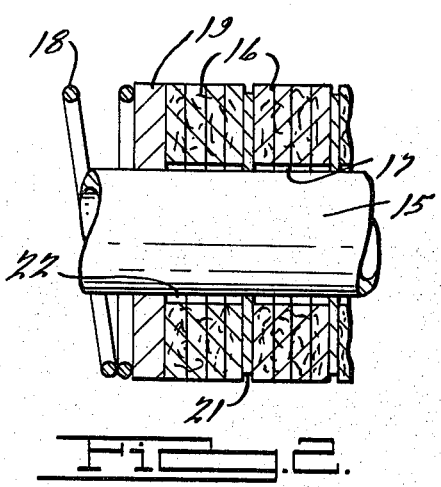
FIG. 2 is a view similar to FIG. 1 but illustrating a second type of construction, that is, applying take-up end pressure to short cylindrical bonded fiber shells slidably mounted on the mandrel.

The two basic systems for carrying out the invention are shown in FIGS. 1 and 2. In FIG. 1, the cylindrical metal mandrel is indicated at 11 and the short monolithic aluminum silicate annular fiber discs are shown at 12. Each disc or short group of discs is attached at 13 to the metal mandrel. Adjacent discs are bonded to each other in short groups except at predetermined locations which allows the monolithic sub-assemblies to move toward and away from each other leaving the variable space 14. This system could be termed an "expansion joint system." Since each sub-assembly or disc 12 is relatively short in an axial direction, stresses due to differences in thermal expansion between the cylinder and discs will be small. As a consequence, each sub-assembly 12 will be able to retain its bonded condition with respect to the mandrel. When the mandrel expands axially, the sub-assemblies will move proportionately away from each other, and the mandrel will have a series of gaps 14 of relatively small dimensions spaced along its length at each predetermined joint between the monolithic sub-assemblies. This system can be used when small gaps can be tolerated between the monolithic sub-assemblies, or when, for some reason, it would not be feasible to have an end take-up system as shown in FIG. 2. The expansion joint system may also be used when the radial disc loading due to the workpieces is relatively high and it would therefore be difficult to provide for relative axial movement between the mandrel and the disc sub-assemblies. Each monolithic sub-assembly 12 in the expansion joint system is attached to the mandrel by any of various methods, either bonding or mechanical attachment, as described below.

The end take-up system shown in FIG. 2 would utilize a mandrel 15 and monolithic sub-assemblies or fiber discs 16 which are relatively short. The inside diameter 17 of discs 16 could either be spaced from the mandrel surface or, if slidable therein, be provided with a wear resistant surface. An end take-up means indicated schematically by the spring 18 is provided which, for example through a member 19, constantly applies an axial compressive force to the monolithic sub-assemblies. These are interspersed with separators or bond preventing release agents indicated schematically at 21 which, as will be seen later, may take the form of structural separators such as metallic members, non-structural separators, such as metallic foils, or chemical agents or coatings which prevent bonding. In this arrangement, with structural separators, a space 22 may exist between the inside diameter 17 and the metal mandrel so that the fiber discs themselves do not wear with respect to the metal mandrel. Any sliding contact will occur between the structural separating members and the metal mandrel. If non-structural separators are used, no space should exist between the discs and mandrel, since the disc-supporting function of the separators will not be present.

Figure 3:
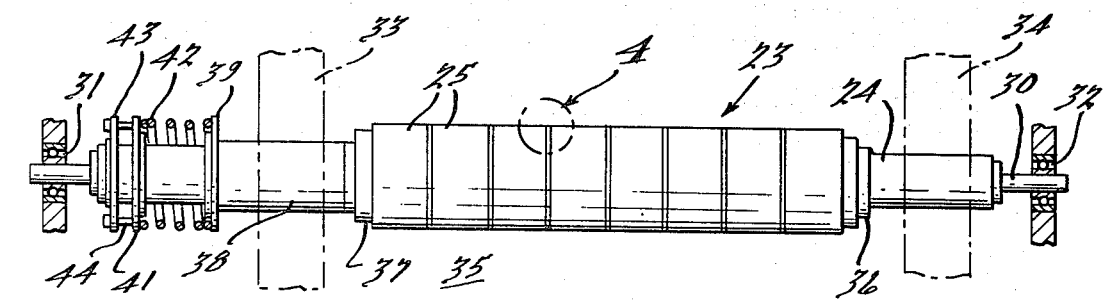
FIG. 3 is a partially sectioned side elevational view of a first embodiment of the invention using an external spring takeup system for the fiber discs.
Figure 4:
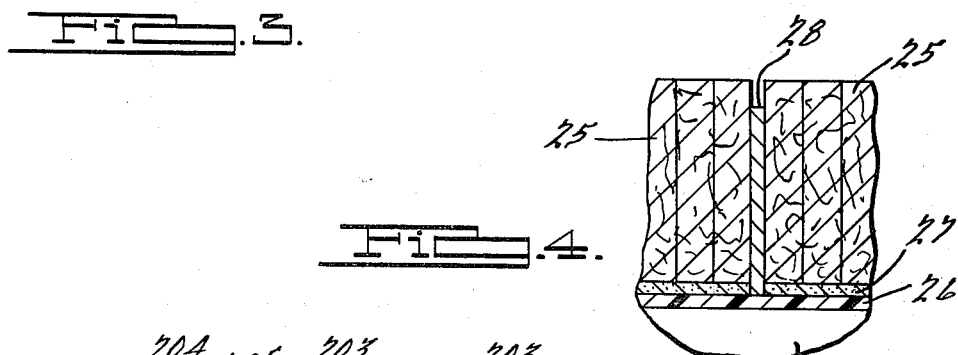
FIG. 4 is an enlarged fragmentary cross-sectional view of the roller in the area of the circle 4 of FIG. 3 showing the metal foil inserts between the fiber discs.

Turning now to specific embodiments of the invention, FIGS. 3 and 4 show a roller generally indicated at 23 and comprising an elongated cylindrical metallic mandrel 24 and a plurality of monolithic sub-assemblies in the form of fiber discs 25. The fiber disces are fabricated of aluminum silicate fibers which may be prepared by a wet lay-up method using commonly available commercial binders such as Ludox. Annular discs 25 are assembled in the wet condition. Each disc may be compressed as a sub-assembly, or as an integral assembly with suitable spacers or bond prevention coatings, until a slight amount of binder is exuded from the assembly. It is usually important that excessive compression not be used which might squeeze the binder out of the fibers and reduce the effectiveness of the final construction. Typical discs would range in thickness from $\frac{1}{4}$ inch to approximately 1 inch, with the percentage of binder being generally less than 30% by weight of the total combined weight of the dried matrix.

Mandrel 24 may be coated with a release agent 26, for example, teflon tape, polyethylene, a silicon type of material, or a loose oxide coating, which will prevent adherence of the fiber discs to the mandrel.

The monolithic sub-assemblies 25 may be suitably reinforced on their inside diameters with an additional hardener 27 or various cementitious types of materials to provide increased strength to the fibers on the inside diameters.

Separators, in the form of annular discs 28 or bond prevention coating, are provided between adjacent monolithic sub-assemblies 25. These separators provide a pre-established expansion joint pattern for the entire assembly. By using monolithic fiber elements 25 of short length and "expansion joints" 28 therebetween, the aforementioned "milled-out" effect of relative deflection between the mandrel and the roll covering is eliminated. Rather than acting as a very stiff ceramic sleeve mounted on the relatively elastic mandrel, fiber sub-assemblies 25 act like beads on a chain, which will shift angularly relative to each other as the mandrel bends in use.

After sub-assemblies 25 have been assembled on mandrel 24, they may be dried and turned or machined to the proper dimensions, and further coatings of Ludox, aluminum phosphate or other hardening materials may be used to provide a higher concentration of binder near the roll surface and a consequent improvement in wear resistance. Multiple coats of binders may cause further shrinkage of the disc surface. It therefore may be desirable to close any gaps by applying slight additional compression after the final surface binder coats have been applied. In some instances, it is possible to machine sub-assemblies 25 prior to their being assembled onto mandrel 24, the assembly being made with sufficient accuracy to eliminate the need for further machining.

A shaft 30 extends through roller 23 and is supported at opposite ends of bearings 31 and 32. Mandrel 24 is shown as extending through walls 33 and 34 of a furnace 35.

A collar 36 is fixed to mandrel 24 immediately inside wall 34 and a sliding collar 37 is mounted on mandrel 24 inside wall 33. Discs 25 are disposed between these two collars. A sleeve 38 is slidably mounted on mandrel 24 and extends through wall 33, one end engaging sliding collar 37. A spring collar 39 is attached to the other end of sleeve 38, and another sleeve collar 41 is slidable on mandrel 24 outwardly of collar 39. An air cooled helical coil compression spring 42 is disposed between collars 39 and 41. A fixed collar 43 is secured to mandrel 24 outwardly of collar 41, and carries take-up screws 44 which adjust the axial position of collar 41. This provides an adjustment of the end pressure which spring 42 exerts through collar 39 and sleeve 38 on sliding collar 37, and therefore on disc sub-assemblies 25. Alternately, collar 41 may be fixed and screws 44 and collar 43 omitted.

In operation, axial expansion of mandrel 24 due to elevated temperatures will cause relative sliding of the mandrel with respect to sub-assemblies 25 but the release agent with which the mandrel is coated will prevent any damage due to adherence of the fiber discs. The discs will at all times be held together by spring 42. At the same time the discs will not be subject to wear or damage due to the bending and expansion phenomena described above.

FIGS. 5, 6 and 7 show another embodiment of the invention in which the roller, generally indicated at 101, comprises a metallic mandrel 102 and monolithic fiber disc sub-assemblies 103. The monolithic sub-assemblies each comprise a plurality of discs 104 which are held at their opposite ends by a pair of annular metallic retainer plates 105 and 106. A plurality of circumferentially spaced threaded tie rods 107 extends between plates 105 and 106, passing through discs 104. The discs compressed between each pair of plates 105 and 106 comprise a monolithic sub-assembly. Usually a tubular spacer 108 surrounds each tie rod 107 to allow for a predetermined compressed dimension by tightening nuts 109. In the case of sub-assemblies held together with tie rods and spacers, it is feasible to accomplish all the compression in the sub-assembly and thereby avoid the high cost of tooling associated with compressing the discs on the mandrel.

The inside diameters of discs 104 may be larger than the outside diameter of the mandrel whereas the inside diameters of retainer plates 105 and 106 may be closer to that of the mandrel. In this manner, the metal plates will be locked into position at elevated temperatures. Alternatively, or in addition, keys 111 may be formed on mandrel 102 which interfit with key slots in the retainer plates. Tie rods 107 extend beyond nuts 109, as indicated at 112 in FIG. 5, into recesses 113 of the adjacent sub-assembly 103. The sub-assemblies are thus interlocked against relative rotation. Clearance holes 114 are provided in plates 106 for the adjacent heads 115 of threaded tie rods 107. If desired, a binder 116 could be applied to the inside diameters of discs 104 for additional strength. Similarly, a binder coating 117 may be applied to the outside diameter of the discs as a hardener after drying and machining.

The narrow clearance between retainer plates 105, 106 and the mandrel as described above would be used if the assembly is to be of the expansion joint type described with respect to FIG. 1. On the other hand, if the take-up system is to be used, the clearance of the retainer plates will be relatively generous.

Figure 8:
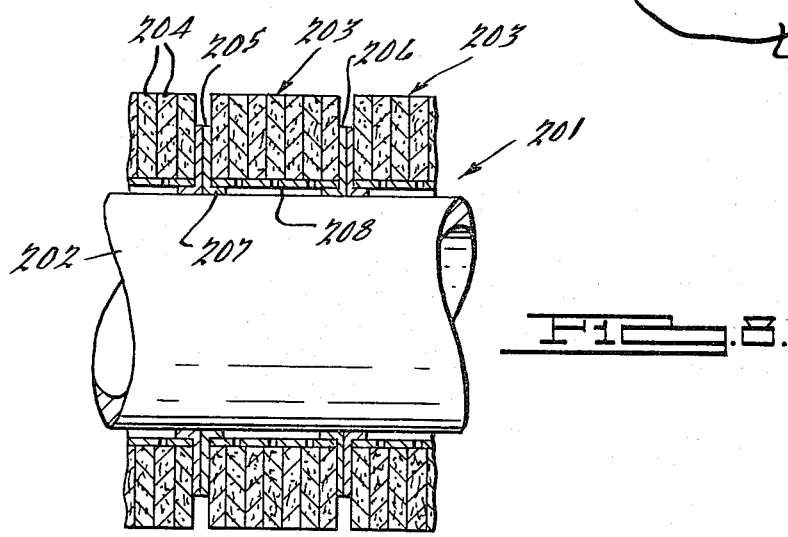
FIG. 8 is a cross-sectional view showing an alternative monolithic sub-assembly utilizing an expanded metal tube with end flanges attached to hold the fiber discs.

Another arrangement is shown in FIG. 8 and comprises a roller generally indicated at 201 having a metallic mandrel 202 and a series of sub-assemblies of fiber discs generally indicated at 203. Each sub-assembly in this case comprises a plurality of fiber discs 204 which are disposed between two flanged plates 205 and 206. The flanged plates may be made of perforated or expanded metal and have sleeve portions 207 surrounding mandrel 202. The clearance between sleeve portions 207 and the mandrel would depend upon whether the axial take-up system or the expansion joint system is being used. An expanded or perforated metal tube 208 extends between the flanges 207 of plates 205 and 206 and is secured to them. Fiber discs 204 surround the tube. Thus, the entire assembly comprises the cylindrical metal mandrel and a group of intermediate members each consisting of flanges 205 and 206 connected by tube 208. Each flanged sub-assembly contains a small group of aluminum silicate fiber discs 204 suitably treated with a binder. If desired, reinforcement binder could be applied to the inside diameter of the discs and the expanded metal tube.

FIGS. 9 and 10 show still another embodiment of the invention in which the roller is generally indicated at 301 and comprises a metallic cylindrical mandrel 302 and short monolithic fiber disc groups 303. Mandrel 302 has a roughened surface 304 which could be created either by a heavy thread, sand blasting or other type of roughening so as to provide a bond gripping surface. Alternatively or in addition, an expanded metal 305 could be tack welded to the mandrel to provide an interlocking surface for the fiber adhesive 306. Elements 307 in the form of separators, spacers or chemical release agents, are inserted between segments 303. Adhesive 306 will thus bond the monolithic fiber disc segments 303 to the mandrel. The result will be an "expansion joint" type of construction achieving the objects of the invention.

FIG. 11 shows an internal axial take-up system which is manually operated. The roller is generally indicated at 401 and comprises a metallic mandrel 402 and fiber discs 403 with spacers 404. A collar 405 engages one end of the series of discs and is slidable on the mandrel. A pusher 406 within the mandrel is engageable with collar 405 and has fingers 407 extending through slots 408 for this purpose. The end 409 of mandrel 402 supports a smaller tube 411 by means of adaptor 412. A journal 413 is carried by tube 411 and a nut 414 is welded to the end of this journal. An adjustment screw or push rod 415 is threadably mounted in nut 414 and is rotatably coupled at 416 to an intermediate push rod 417. This push rod is in turn coupled to pusher 406. A collar 418 may be secured to the end of push rod 417 to facilitate the engagement of pusher 406. Rotation of push rod 415 will thus adjust the compression in discs 403.

FIG. 12 shows another embodiment of an internal take-up system which is spring loaded. In this case the take-up system is generally indicated at 501 and comprises a push rod 502 which is connected to a pusher (not shown) similar to that indicated at 406 in the previous embodiment. An extension 503 secured to the mandrel (not shown) carries a pair of spaced members 504 and 505 connected by tie rods 506. A helical coil compression spring 507 abuts members 505 at one end. The other end engages a collar 508 which is threadably mounted on a pusher adjustment screw 509. This screw may have a reduced end 511 disposed within a recess 512 at the end of push rod 502. Thus, pressure of spring 507 on the push rod through members 508 and 509 will create constant compressive forces on the fiber discs to accommodate relative expansion and contraction.

FIG. 13 shows another embodiment of an internal take-up system which is generally indicated at 601. A push rod 602 is connected as before to the fiber discs (not shown). An extension 603 attached to the mandrel carries a pair of spaced members 604 and 605 connected by tie rods 606. A diaphragm 607 is disposed between members 605 and an adjustable length rod 608. This rod engages push rod 602. Diaphragm 607 forms a closed chamber so that it may be pressurized to increase or decrease the compressive forces on the discs.

FIG. 14 shows another embodiment of the expansion joint system in which the roller is generally indicated at 701, and comprises a cylindrical mandrel 702 and short monolithic segments 703 of fiber discs. Metallic spacers 704 are disposed between each pair of adjacent monolithic segments. These metallic spacers have drawn inside diameter portions 705, so constructed as to snap into circumferential grooves 706 in mandrel 702 at the proper locations between adjacent segments 703. Equivalent locking arrangements could be used in place of these snap grooves.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. A high temperature roller comprising an elongated cylindrical metal mandrel, a series of relatively short monolithic shell sub-assemblies each mounted on said mandrel, each sub-assembly being fabricated of fibers taken from the group comprising aluminum silicate, glass, or mineral wool and a binder, structural spacers inserted between adjacent monolithic sub-assemblies and separating said sub-assemblies whereby transverse bending of said mandrel will be accommodated by relative angular shifting of said sub-assemblies, and means holding said sub-assemblies on said mandrel while accommodating differences in thermal expansion.

2. The combination according to claim 1, said structural spacers having inside diameters closely adjacent the shaft diameter whereby the spacers will be locked to the shaft during operation of the roller.

3. The combination according to claim 1, said separating means having inside diameters which are free from said mandrel, said holding means comprising take-up means at one end of said mandrel exerting an axial force on said shells with respect to said mandrel.

4. The combination according to claim 3, said mandrel being smooth and coated with a release agent to prevent bonding of said shells thereto.

5. The combination according to claims 1 or 4, said shells being coated on their inside diameters with a reinforcing material.

6. The combination according to claim 3, said take-up means comprising a sleeve on said mandrel and a helical coil compression spring exerting an axial force on said sleeve.

* * * * *